United States Patent
Moe (10) Patent No.: US 6,454,219 B1
(45) Date of Patent: Sep. 24, 2002

(54) AIRCRAFT WING AND METHOD FOR REDUCING AIRFRAME-GENERATED NOISE

(75) Inventor: Jeffrey W. Moe, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/729,518

(22) Filed: Dec. 4, 2000

(51) Int. Cl.[7] .................................................. B64C 3/50

(52) U.S. Cl. .................... 244/214; 244/214; 244/216

(58) Field of Search .................................. 244/213–217; 181/214, 203, 206, 213, 222, 256, 212, 262, 292, 290; 415/219, DIG. 1

(56) References Cited

U.S. PATENT DOCUMENTS

| | | | | |
|---|---|---|---|---|
| 3,721,389 A | * | 3/1973 | MacKinnon et al. | 181/206 |
| 3,952,823 A | * | 4/1976 | Hinderks | 181/43 |
| 4,099,691 A | * | 7/1978 | Swanson et al. | 244/214 |
| 4,749,150 A | * | 6/1988 | Rose et al. | 244/1 N |
| 4,752,049 A | * | 6/1988 | Cole | 244/214 |
| 5,445,861 A | * | 8/1995 | Newton et al. | 181/290 |
| 5,702,231 A | * | 12/1997 | Dougherty | 181/212 |
| 5,738,298 A | | 4/1998 | Ross et al. | |
| 5,749,546 A | | 5/1998 | Blackner et al. | 244/215 |
| 6,180,206 B1 | * | 1/2001 | Kain, Jr. | 428/116 |

OTHER PUBLICATIONS

M. Chun–Yung Niu, Airframe Structural Design, pp. 326–29 (Commilit Press Ltd. 1988).

Rohr, Inc., DynaRohr™, *An Advanced Noise Suppression System*.

* cited by examiner

*Primary Examiner*—Galen L. Barefoot
(74) *Attorney, Agent, or Firm*—Baker Botts LLP (57) ABSTRACT

An aircraft wing useful for reducing wing-generated noise comprises:

(a) a main element having a leading edge and a trailing edge;

(b) at least one slat having a leading edge and a trailing edge, wherein the slat acts cooperatively with the main element to provide lift to the aircraft, and the main edge leading edge and slat trailing edge define a cavity there between; and (c) at least one sound-absorbing structure located on at least a portion of the main element leading edge, at least a portion of the slat trailing edge, in the cavity, or combinations thereof.

If located on the main element leading edge or slat-trailing edge, the sound-absorbing structure may be a honeycomb load-bearing structure such as a honeycomb load-bearing structure having a perforated skin or a machine grid structure having an outer skin which is bonded or perforated. If located in the cavity, the sound-absorbing structure may be a flow blocker. The sound-absorbing structure is typically covered during the normal cruise portion of the aircraft's flight, and thus does not adversely impact aerodynamic performance. A method of reducing such wing-generated noise comprises providing the above-described wing for use in an aircraft in flight.

24 Claims, 6 Drawing Sheets

AIRCRAFT WING AND METHOD FOR REDUCING AIRFRAME-GENERATED NOISE

BACKGROUND OF THE INVENTION

1. Field of the Invention

This invention relates to an aircraft wing which exhibits reduced airframe-generated noise, and to a method of reducing noise generated by an aircraft wing. More particularly, the aircraft wing of this invention has a leading edge slat which cooperates with the wing main element. One or more sound-absorbing or acoustically treated structures are employed on the forward edge of the main element and the trailing edge of the slat, or in the cavity formed between the slat and the main element, or both, to reduce airframe-generated noise.

2. Background Information

The desirability of reducing the noise generated by an aircraft is well-known to those skilled in the art. As discussed, for example, in U.S. Pat. No. 5,749,546, both the airplane's airframe and engines produce varying amounts of objectionable audible noises during departure and approach conditions. More particularly, airframe noise is generated by a fluid (such as air) flowing over the airplane's fuselage, landing gear, wing, and wing leading edge, and high-lift devices such as slats and trailing edge flap systems.

U.S. Pat. No. 5,749,546 is directed to reducing the noise generated by an aircraft airframe by providing a rounded flap edge cap to reduce any noise-generating secondary vortices that may be produced by the flap edge when it is exposed to a fluid such as air while the wing is moving.

U.S. Pat. No. 5,738,298 is directed to an aircraft wing having an apparatus for reducing lift-generated noise caused by the high lift system of the aircraft wing, i.e. the slat system located on the forward edge of the aircraft wing. The apparatus employed is a plurality of tip fences secured to the trailing and leading assemblies of the high-lift system, as close as possible to the discontinuities where the noise-generating vortices are most likely to form.

However, there are likely to be instances in which use of a tip fence such as disclosed in U.S. Pat. No. 5,738,298 is less preferable than a method of reducing airframe-generated noise produced by the high-lift system in which the assembly used therein more closely conforms to the airfoil design and shape. Moreover, it is known that the downward directed noise component generated by the cavity located between the slat trailing edge and wing leading edge is a major contributor to noise heard by ground-based observers.

Accordingly, it is one object of this invention to provide an aircraft wing which employs an assembly which closely aligns with the contours of the airfoil shape and design and which reduces noise generated by the wing, and particularly noise generated by the cavity located between the slat trailing edge and wing leading edge. It is one feature of this invention that the assembly may be one or more sound-absorbing or acoustically treated structures positioned on the forward edge of the wing main element or the trailing edge of the slat, or both. It is another feature of this invention that the assembly may be one or more sound-absorbing or acoustically treated structures positioned in the cavity formed between the slat and the main element. It is another feature of this invention that the assembly may include combinations of the above-described structures positioned: (i) on the forward edge of the wing main element; (ii) on the trailing edge of the slat; and (iii) in the cavity formed between the main element and the slat.

It is another object of this invention to provide a method of reducing noise generated by an aircraft wing using the above-described assembly. Other objects, features and advantages of this invention will be apparent from the detailed description set forth below.

SUMMARY OF THE INVENTION

An aircraft wing useful for reducing wing-generated noise comprises:

(a) a main element having a leading edge and a trailing edge;

(b) at least one slat having a leading edge and a trailing edge, wherein the slat acts cooperatively with the main element to provide lift to the aircraft, and the main element leading edge and slat trailing edge define a cavity therebetween; and (c) at least one sound-absorbing structure located on at least a portion of the main element leading edge, at least a portion of the slat trailing edge, in the cavity, or combinations thereof.

If located on the main element leading edge or slat trailing edge, the sound-absorbing structure may be a honeycomb load-bearing structure such as a honeycomb load-bearing structure having a perforated skin or a machine grid structure having an outer skin which is bonded or perforated. If located in the cavity, the sound-absorbing structure may be a flow blocker. The sound-absorbing structure is typically covered during the normal cruise portion of the aircraft's flight, and thus does not adversely impact aerodynamic performance.

A method of reducing such wing-generated noise comprises providing the above-described wing for use in an aircraft in flight.

DETAILED DESCRIPTION OF THE INVENTION

Figure 1:
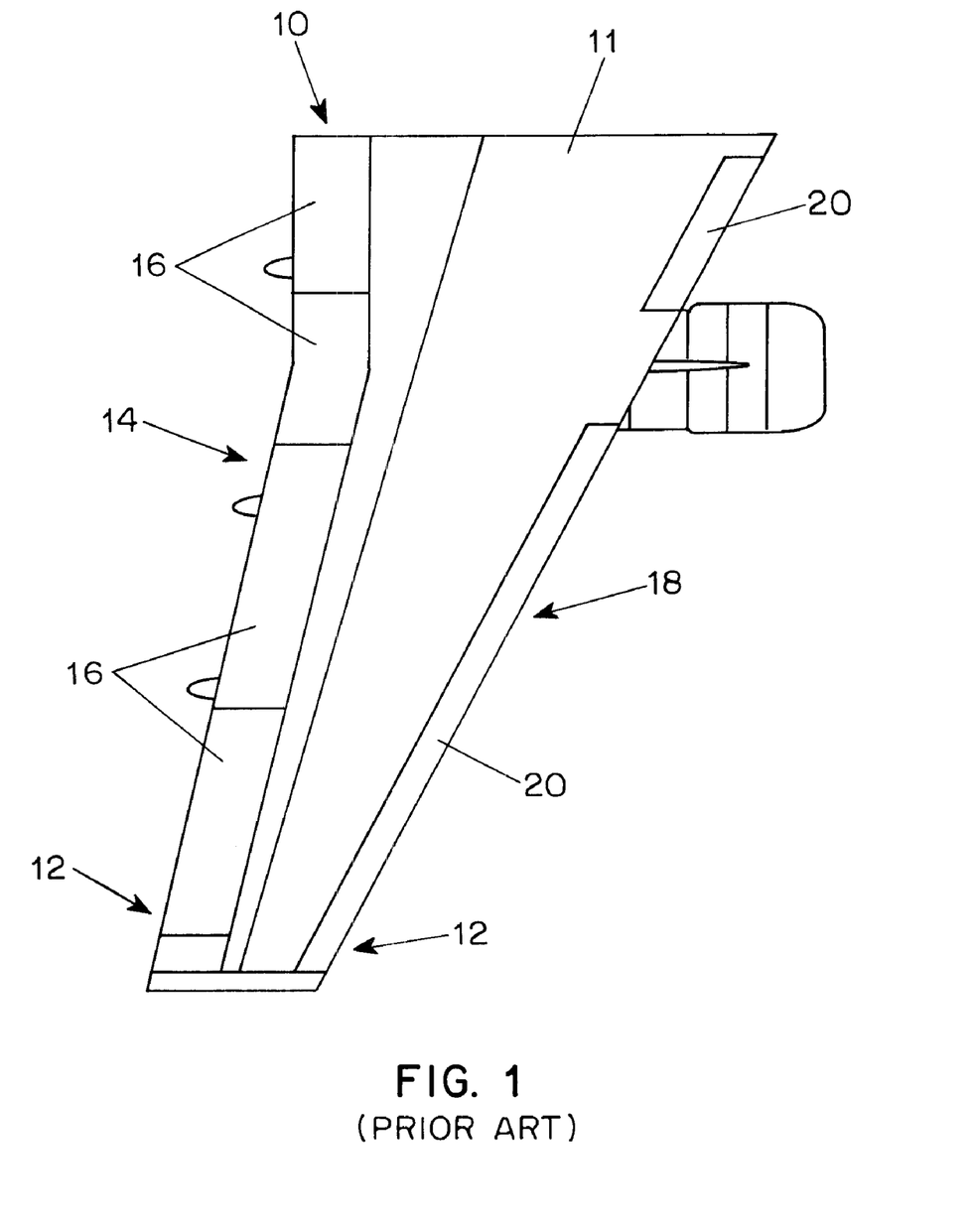
FIG. 1 depicts a top plan view of an aircraft wing as set forth in U.S. Pat. No. 5,738,298.

FIG. 1 depicts an overall view of an aircraft wing and related structures, as disclosed in FIG. 1 and col. 4, lines 6–26 of U.S. Pat. No. 5,738,298. More specifically, FIG. 1 illustrates an aircraft wing 10 that includes a main element 11 and a high-lift system 12. The high-lift system 12 comprises a plurality of moveable components, such as a trailing assembly 14 formed of a plurality of adjacent flaps 16, and a leading assembly 18 formed of a plurality of slats 20.

A typical mode of operation during takeoff and landing of the aircraft wold be as follows. During takeoff, the slats 20 of the leading assembly 18 are partially extended to provide a clean flow over the main element 11. Shortly after take-off, the slats 20 would be retracted to improve the lift-over-drag (L/D) ratio of the climbout configuration. The transition from the take-off configuration to the climbout configuration would be completed by the time the aircraft reaches an altitude of approximately 700 feet, at which community noise impact becomes an issue. The flaps 16 are partially extended for take-off and climbout. During landing, the slats 20 and the flaps 16 are fully extended, and significant aerodynamic noise may be generated.

Figure 2:
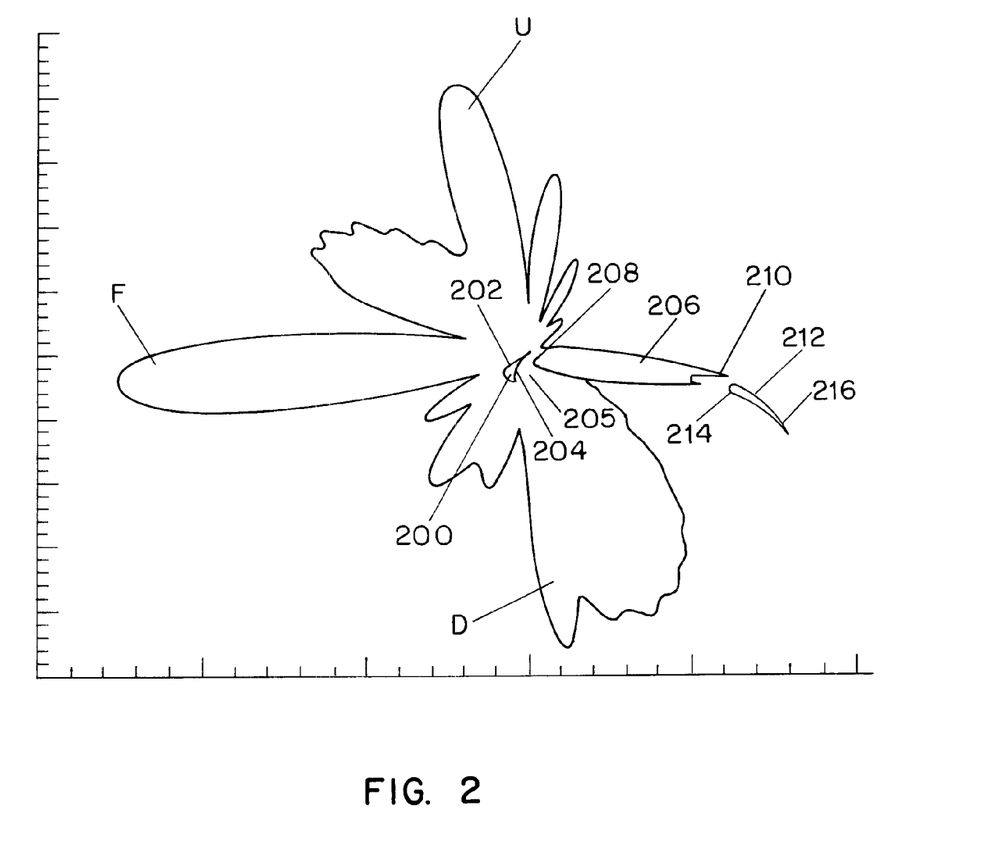
FIG. 2 depicts a slat-generated noise field.

As depicted in FIG. 2, an aircraft slat-wing combination typically generates a noise field when the aircraft is in flight due to sound pressure patterns generated at the slat-wing interface. More particularly, FIG. 2 shows the slat generated noise field from the superimposed slat-wing-flap configuration depicted therein, where slat 200 has a leading edge 202 and trailing edge 204, the wing main element 206 has a leading edge 208 and trailing edge 210, and the flap 212 has a leading edge 214 and trailing edge 216. Cavity 205 is located between slat trailing edge 204 and main element leading edge 208. As shown in FIG. 2, the noise field has a large, downward-directed component (labeled "D") which will be heard by ground-based observers. This downward-directed noise component is much less desirable than forward-directed noise component (labeled "F") or upward directed noise component (labeled "U").

Figure 3:
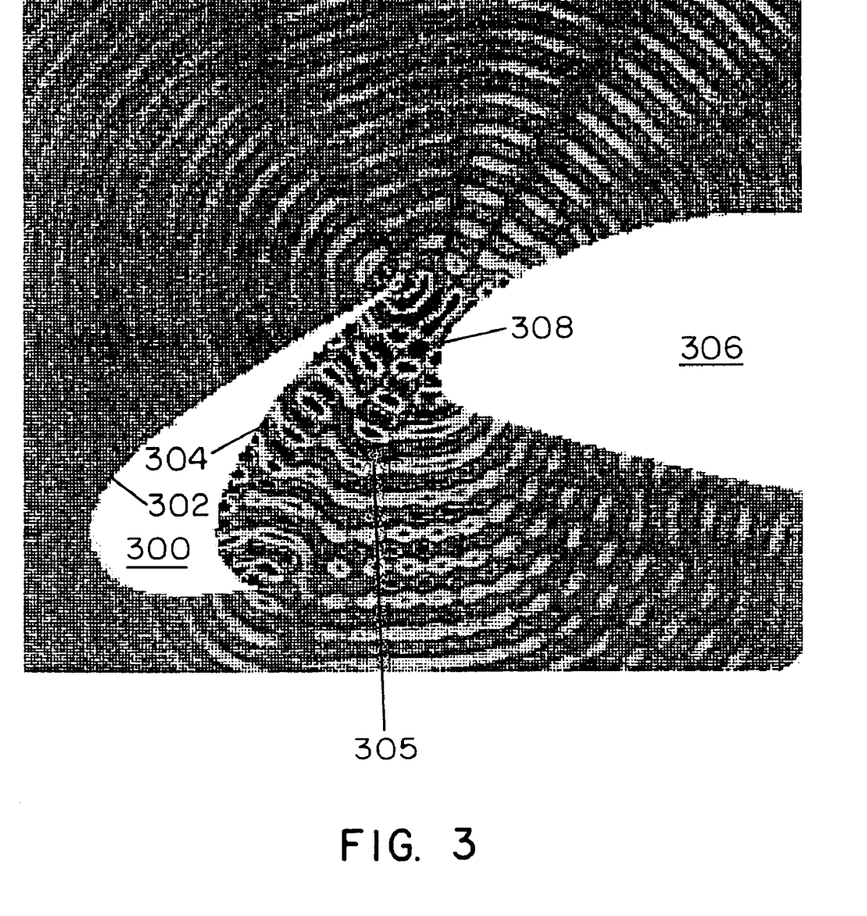
FIG. 3 depicts a sound pressure pattern from a slat trailing edge.

FIG. 3 depicts a sound pressure pattern radiating from the slat trailing edge. In FIG. 3, slat 300 has a leading edge 302 and trailing edge 304, and the wing main element 306 has a leading edge 308 (the wing main element trailing edge and flap are not shown). The sound pressure pattern caused by movement of the wing through the air is seen to be generated from the interface of the slat trailing edge 304 and main element leading edge 308, as well as cavity 305 therebetween. Without wishing to be bound by any one theory, it is theorized that cavity 305 bound by slat trailing edge 304 and main element leading edge 308 acts as a "horn," thereby amplifying the sound generated therein and propagating a large component of the sound wave downward, where it can be heard by ground-based observers, as depicted in FIG. 2. Thus, in accordance with this invention, it is most useful to employ at least one sound-absorbing structure located on at least a portion of the main element leading edge, at least a portion of the slat trailing edge, in the cavity therebetween, or combinations thereof.

Various slat-wing main element configurations may be employed in conjunction with this invention. Such configurations are well known to those skilled in the art, and are described, for example, in M. Chun-Yung Niu, *Aircraft Structural Design*, pp. 326–29 (Conmilit Press Ltd. 1988).

Figure 4:
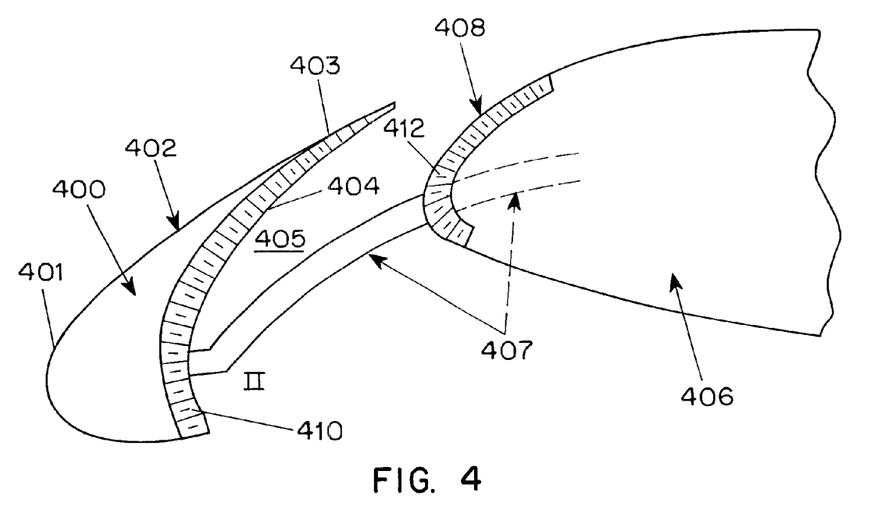
FIG. 4 depicts an embodiment of this invention in which the slat trailing edge and main element leading edge each have a sound-absorbing structure integral thereto.

FIG. 4 depicts a particularly preferred embodiment of this invention in which the slat trailing edge and main element leading edge each have a sound-absorbing structure integral thereto. More particularly, FIG. 4 shows a cross-sectional detail overall view of a slat-wing main element configuration in which slat 400 has a leading edge 402 (having a leading segment 401 and a trailing segment 403) and trailing edge 404, and the wing main element 406 has a leading edge 408 and trailing edge (not shown). Slat trailing edge 404 and main element leading edge 408 include a cavity 405 therebetween. Slat 400 may be moved via track 407 as shown between a first position (I) adjacent to the wing main element when the slat 400 is retracted and a second position (II) in which the slat 400 is extended (e.g. during takeoff) to provide clean air flow over the main element 406. As shown, track 407 retracts into the wing main element 406 as slat 400 moves into position (I). In the embodiment of FIG. 4, a first sound-absorbing structure 410 is located along the slat trailing edge 404, and a second sound-absorbing structure 412 is located along the main element leading edge 408. In another preferred embodiment, the outer skin of slat trailing segment 403 is optionally perforated or has an additional sound-absorbing structure located thereon, particularly along the interface of slat trailing segment 403 and slat trailing edge 404.

Figure 5:
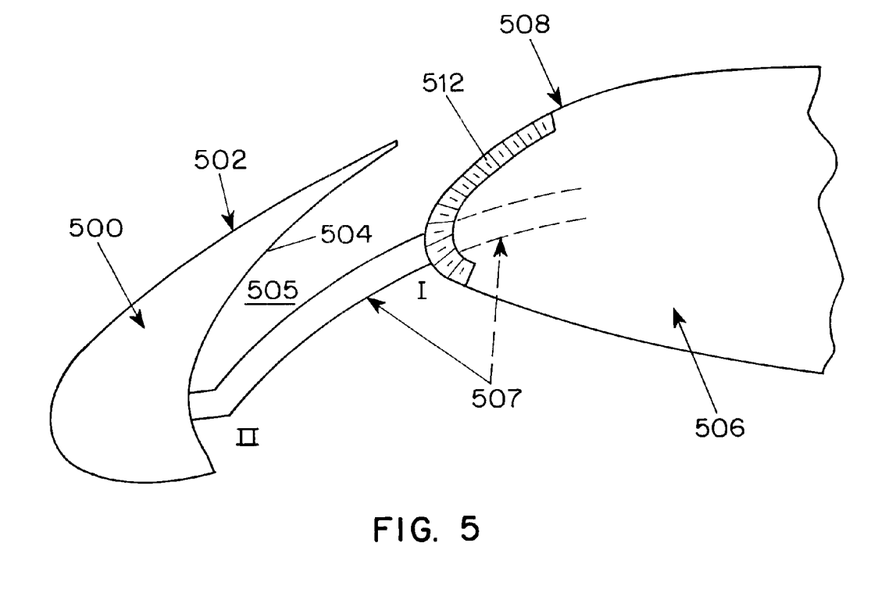
FIG. 5 depicts an embodiment of this invention in which only the main element leading edge has a sound-absorbing structure integral thereto.

FIG. 5 depicts another embodiment of this invention in which only the main element leading edge has a sound-absorbing structure integral thereto. More particularly, FIG. 5 shows a cross-sectional detail overall view of a slat-wing main element configuration in which slat 500 has a leading edge 502 and trailing edge 504, and the wing main element 506 has a leading edge 508 and trailing edge (not shown). Slat trailing edge 504 and main element leading edge 508 include a cavity 505 therebetween. Slat 500 may be moved via track 507 as shown between a first position (I) adjacent to the wing main element 506 when the slat 500 is retracted and a second position (II) in which the slat 500 is extended (e.g. during takeoff to provide clean air flow over the main element 506. As shown, track 507 retracts into the wing main element 506 as slat 500 moves into position (I). In the embodiment of FIG. 5, a sound-absorbing structure 512 is located only along the main element leading edge 508.

Figure 6:
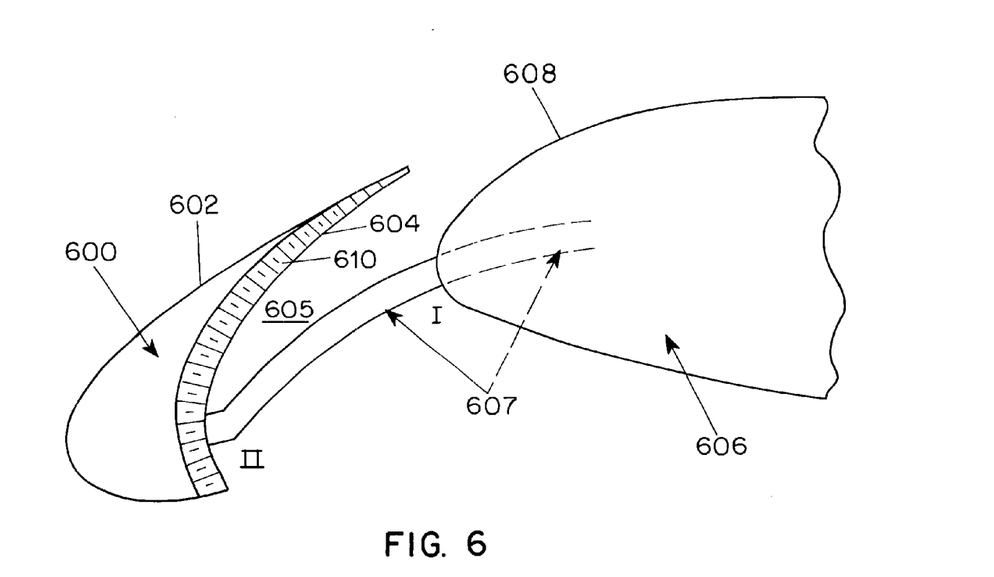
FIG. 6 depicts an embodiment of this invention in which only the slat trailing edge has a sound-absorbing structure integral thereto.

FIG. 6 depicts another embodiment of this invention in which only the slat trailing edge has a sound-absorbing structure integral thereto. More particularly, FIG. 6 shows a cross-sectional detail overall view of a slat-wing main element configuration in which slat 600 has a leading edge 602 and trailing edge 604, and the wing main element 606 has a leading edge 608 and trailing edge (not shown). Slat trailing edge 604 and main element leading edge 608 include a cavity 605 therebetween. Slat 600 may be moved via track 607 as shown between a first position (I) adjacent to the wing main element 606 when the slat 600 is retracted and a second position (II) in which the slat 600 is extended (e.g. during takeoff) to provide clean air flow over the main element 606. As shown, track 607 retracts into the wing main element 606 as slat 600 moves into position (I). In the embodiment of FIG. 6, a sound-absorbing structure 610 is located only along the slat trailing edge 604.

Figure 7:
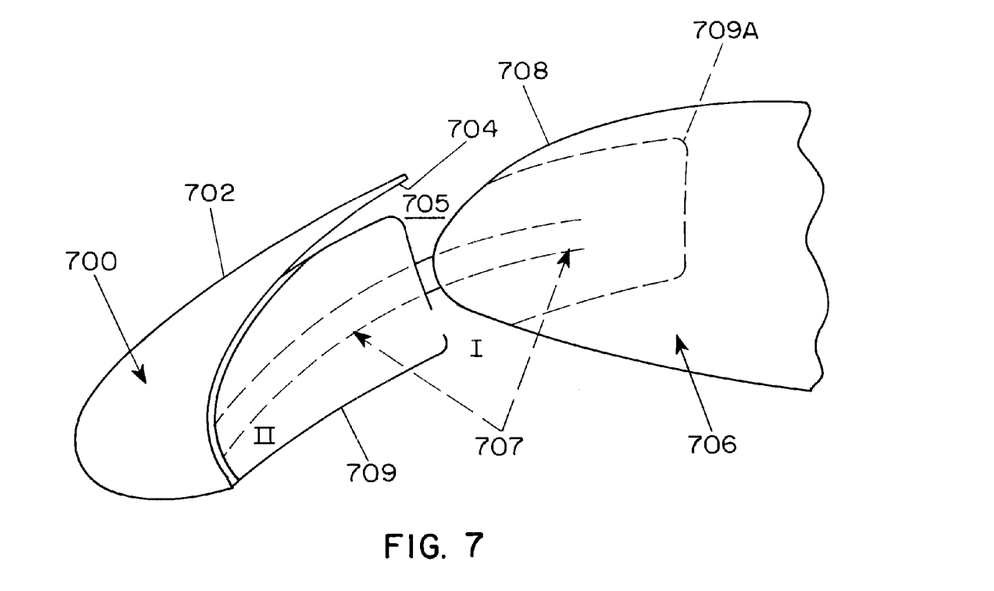
FIG. 7 depicts an embodiment of this invention in which flow blockers are located in the cavity defined by the trailing edge of the slat and leading edge of the main element.

FIG. 7 depicts another embodiment of this invention in which a flow blocker is located in the cavity located between the trailing edge of the slat and the leading edge of the main element. More particularly, FIG. 7 shows a cross-sectional detail overall view of a slat-wing main element configuration in which slat 700 has a leading edge 702 and trailing edge 704, and the wing main element 706 has a leading edge 708 and trailing edge (not shown). Slat trailing edge 704 and main element leading edge 708 define a cavity 705 therebetween. Slat 700 may be moved via track 707 as shown between a first position (I) adjacent to the wing main element 706 when the slat 700 is retracted and a second position (II) in which the slat 700 is extended (e.g. during takeoff) to provide clean air flow over the main element 706. As shown, track 707 retracts into the wing main element 706 as slat 700 moves into position (I). In the embodiment of FIG. 7, the sound-absorbing structure is a flow blocker 709 located within the cavity 705. The flow blocker 709 may be sound-absorbing or acoustically treated as described herein. The silhouette 709A depicting the position of flow blocker 709 when slat 700 is retracted to position (I) is also shown.

Figure 8:
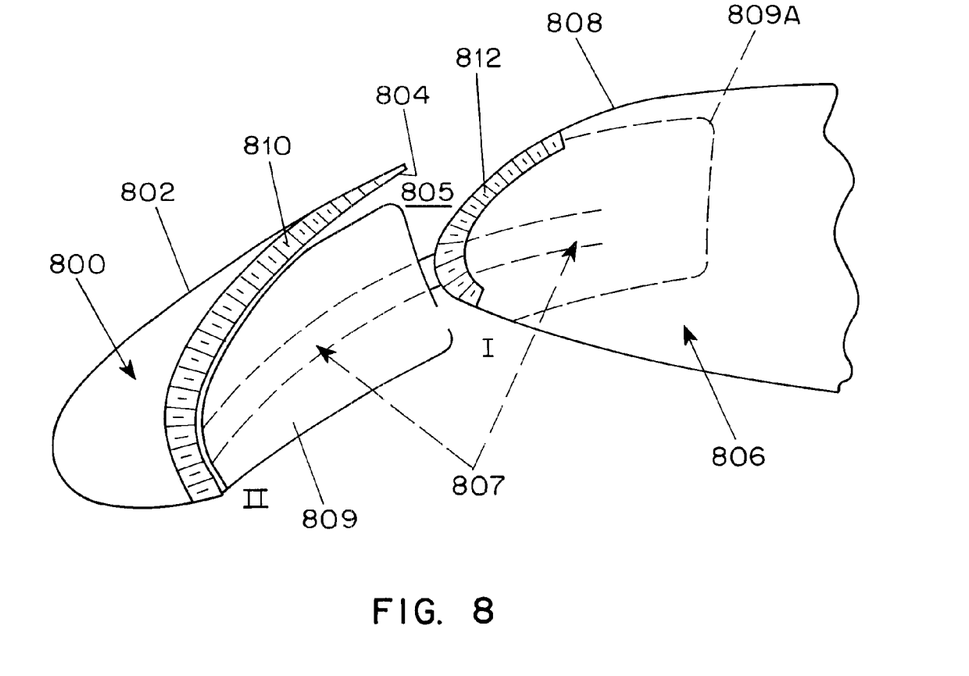
FIG. 8 depicts an embodiment of this invention in which the slat trailing edge and main element leading edge each have a sound-absorbing structure integral thereto, and the cavity therebetween contains a flow blocker.

FIG. 8 depicts another particularly preferred embodiment of this invention in which the slat trailing edge and main element leading edge each have a sound-absorbing structure integral thereto, and the cavity therebetween contains flow blockers. More particularly, FIG. 8 shows a cross-sectional detail overall view of a slat-wing main element configuration in which slat 800 has a leading edge 802 and trailing edge 804, and the wing main element 806 has a leading edge 808 and trailing edge (not shown). Slat trailing edge 804 and main element leading edge 808 define a cavity 805 therebetween. Slat 800 may be moved via track 807 as shown between a first position (I) adjacent to the wing main element 806 when the slat 800 is retracted and a second position (II) in which the slat 800 is extended (e.g. during takeoff) to provide clean air flow over the main element 806. As shown, track 807 retracts into the wing main element 806 as slat 800 moves into position (I). In the embodiment of FIG. 8, a first sound-absorbing structure 810 is located along the slat trailing edge 804, and a second sound-absorbing structure 812 is located along the main element leading edge 808. In addition, a sound-absorbing structure which is a flow blocker 809 is located within the cavity 805. The flow blocker 809 may be sound-absorbing or acoustically treated as described herein. The silhouette 809A depicting the position of flow blocker 809 when slat 800 is retracted to position (I) is also shown.

The sound-absorbing structures and flow blockers described above may be honeycombed load-bearing structures having a perforated skin or a machine grid structure having an outer skin which is bonded or perforated. Such structures are well known to those skilled in the art, and are exemplified by Dyna Rohr™ noise suppression structures, available from Rohr, Inc. Without wishing to be bound by any one theory, it is believed that the sound-absorbing structures located on the slat trailing edge, main element leading edge or combination thereof reduce the acoustic energy traveling in the cavity between the slat and main element. In addition, without wishing to be bound by any one theory, it is believed that the flow blockers installed in the cavity prevent acoustic energy generated proximate to the cavity from propagating streamwise along the main element leading edge.

The sound-absorbing structures located on the slat trailing edge, main element leading edge, as well as the flow blockers located in the cavity are all covered during the normal cruise portion of the aircraft's flight as the slat is retracted to be directly adjacent to the main element. Thus, these features do not adversely impact aerodynamic performance of the aircraft during the normal cruise portion of the flight.

It should be understood that various changes and modifications to the preferred embodiments herein will be apparent to those skilled in the art. Such changes and modifications can be made without departing from the spirit and scope of this invention and without diminishing its attendant advantages. It is therefore intended that such changes and modifications be covered by the appended claims.

I claim:
1. An aircraft wing comprising:
   (a) a main element having a leading edge and a trailing edge;
   (b) at least one slat having a leading edge and a trailing edge, wherein the slat acts cooperatively with the main element to provide lift to the aircraft, and the main element leading edge and slat trailing edge define a cavity therebetween; and
   (c) at least one sound-absorbing structure located on at least an exterior portion of the main element leading edge, at least an exterior portion of the slat trailing edge, in the cavity, or combinations thereof.
2. The wind of claim 1, in which the sound-absorbing structure is a honeycomb load-bearing structure.
3. The wing of claim 2, in which the honeycomb load-bearing structure has perforated skin.
4. The wing of claim 1, in which the sound-absorbing structure is a machined grid structure.
5. The wing of claim 4, in which the machined grid structure has an outer skin which is bonded or perforated.
6. The wing of claim 1, in which the sound-absorbing structure is located on the main element leading edge.
7. The wing of claim 1, in which the sound-absorbing structure is located on the slat trailing edge.
8. The wing of claim 1, in which the sound-absorbing structure is located on both the main element leading edge and the slat trailing edge.
9. The wing of claim 1, in which the sound-absorbing structure is located in the cavity.
10. The wing of claim 9, in which the sound-absorbing structure is a flow blocker for preventing acoustic energy from propagating along the main element leading edge.
11. The wing of claim 1, in which the sound-absorbing structure is located on the main element leading edge, the slat trailing edge, and in the cavity.
12. The wing of claim 1, in which the slat leading edge has a leading segment and a trailing segment, and the trailing portion has a sound-absorbing structure integral to at least a portion thereof.
13. A method of reducing noise generated by an aircraft wing when the wing is moving through a fluid, comprising providing an aircraft wing capable of relative motion through the fluid, the wing comprising:
   (a) a main element having a leading edge and a trailing edge;
   (b) at least one slat having a leading edge and a trailing edge, wherein the slat acts cooperatively with the main element to provide lift to the aircraft, and the main edge leading edge and slat trailing edge define a cavity there between; and
   (c) at least one sound-absorbing structure located on at least an exterior portion of the main element leading edge, at least an exterior portion of the slat trailing edge, in the cavity, or combinations thereof.
14. The method wind of claim 13, in which the sound-absorbing structure is a honeycomb load-bearing structure.
15. The method of claim 14, in which the honeycomb load-bearing structure has perforated skin.
16. The method of claim 13, in which the sound-absorbing structure is a machined grid structure.
17. The method of claim 16, in which the machined grid structure has an outer skin which is bonded or perforated.
18. The method of claim 13, in which the sound-absorbing structure is located on the main element leading edge.

19. The method of claim 13, in which the sound-absorbing structure is located on the slat trailing edge.

20. The method of claim 13, in which the sound-absorbing structure is located on both the main element leading edge and the slat trailing edge.

21. The method of claim 13, in which the sound-absorbing structure is located in the cavity.

22. The method of claim 21, in which the sound-absorbing structure is a flow blocker for preventing acoustic energy from propagating along the main element leading edge.

23. The method of claim 22, in which the sound-absorbing structure is located on the main element leading edge, the slat trailing edge, and in the cavity.

24. The method of claim 13, in which the slat leading edge has a leading segment and a trailing segment, and the trailing portion has a sound-absorbing structure integral to at least a portion thereof.

* * * * *